(12) United States Patent
Graf et al.

(10) Patent No.: US 8,757,000 B2
(45) Date of Patent: Jun. 24, 2014

(54) DEVICE FOR ATTACHMENT TO A ROTATING PART OF A RAILWAY AXLE

(75) Inventors: Jens Graf, Schweinfurt (DE); Roberto Moretti, Pinerolo (IT); Silvano Sema, Cercenasco (IT); Marc Defossez, Houten (NL)

(73) Assignee: Aktiebolaget SKF, Göteborg (SE)

( * ) Notice: Subject to any disclaimer, the term of this patent is extended or adjusted under 35 U.S.C. 154(b) by 662 days.

(21) Appl. No.: 12/920,367

(22) PCT Filed: Mar. 5, 2008

(86) PCT No.: PCT/EP2008/001747
§ 371 (c)(1),
(2), (4) Date: Mar. 3, 2011

(87) PCT Pub. No.: WO2009/109200
PCT Pub. Date: Sep. 11, 2009

(65) Prior Publication Data
US 2011/0146409 A1    Jun. 23, 2011

(51) Int. Cl.
*G01M 17/08*    (2006.01)

(52) U.S. Cl.
USPC .............................................. 73/636; 73/593

(58) Field of Classification Search
USPC ............ 73/636, 593; 340/449, 584, 589, 642; 702/183, 185
See application file for complete search history.

(56) References Cited

U.S. PATENT DOCUMENTS

| | | | |
|---|---|---|---|
| 3,718,040 A | 2/1973 | Freeman et al. | |
| 4,119,284 A | 10/1978 | Belmont | |
| 5,433,111 A * | 7/1995 | Hershey et al. | 73/593 |
| 5,438,322 A | 8/1995 | Martin | |
| 5,589,767 A * | 12/1996 | Akamatsu | 324/173 |
| 5,633,628 A | 5/1997 | Denny et al. | |
| 6,675,640 B2 * | 1/2004 | Ehrlich et al. | 73/115.08 |
| 7,184,930 B2 * | 2/2007 | Miyasaka et al. | 702/183 |
| 7,209,817 B2 * | 4/2007 | Abdel-Malek et al. | 701/29.4 |
| 7,392,595 B2 * | 7/2008 | Heimann | 33/550 |
| 7,652,587 B2 * | 1/2010 | Hohn et al. | 340/682 |
| 7,705,743 B2 * | 4/2010 | Barone et al. | 340/682 |
| 7,860,663 B2 * | 12/2010 | Miyasaka et al. | 702/35 |

FOREIGN PATENT DOCUMENTS

| | | |
|---|---|---|
| CH | 1688874 A | 10/2005 |
| CN | 1688874 A | 10/2005 |
| CN | 2919726 Y | 7/2007 |
| DE | 1037950 B | 8/1958 |
| DE | 19827931 C1 | 12/1999 |
| DE | 10307950 A1 | 9/2004 |
| DE | 102006035703 A1 | 2/2008 |
| EP | 0288155 A | 10/1988 |
| EP | 1159182 B1 | 5/2003 |
| RU | 2253088 C1 | 5/2005 |
| WO | WO9602903 A | 2/1996 |
| WO | WO2008080211 A | 7/2008 |

\* cited by examiner

*Primary Examiner* — J M Saint Surin
(74) *Attorney, Agent, or Firm* — Bryan Peckjian; SKF USA Inc. Patent Department

(57) ABSTRACT

The invention refers to a device for attachment to a rotating part (1) of a railway vehicle incorporating an arrangement, which is adapted, during movement of the railway vehicle, to detect and evaluate parameters related to the railway vehicle service and/or to an incipient fault state of wheel bearings (2) in the railway vehicle, and which device (12) is arranged to emit signals representative for the detected and evaluated parameters.

19 Claims, 3 Drawing Sheets

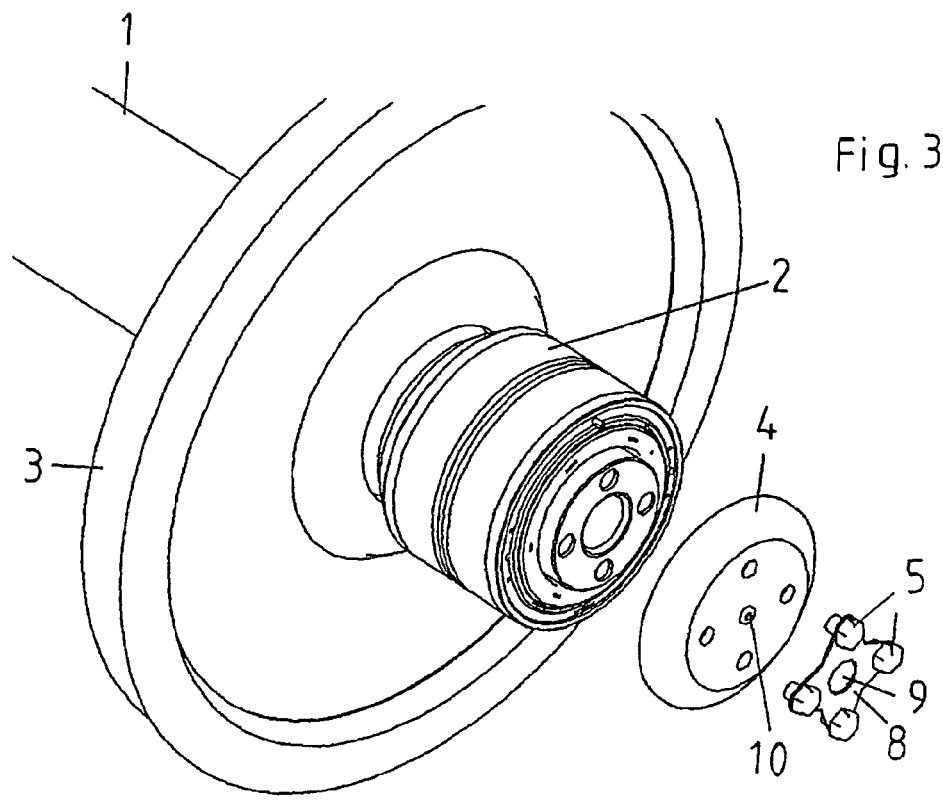
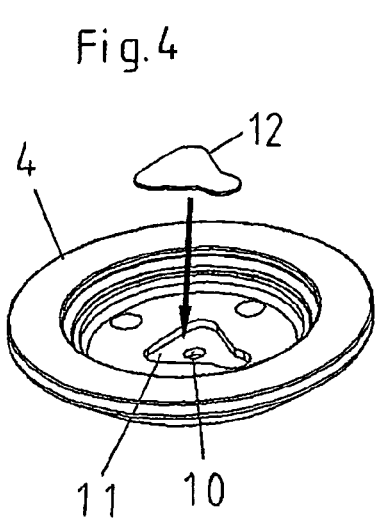
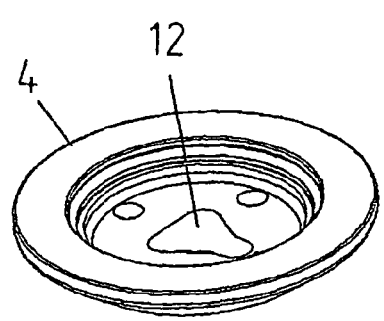
Fig. 3
Fig. 4
Fig. 5

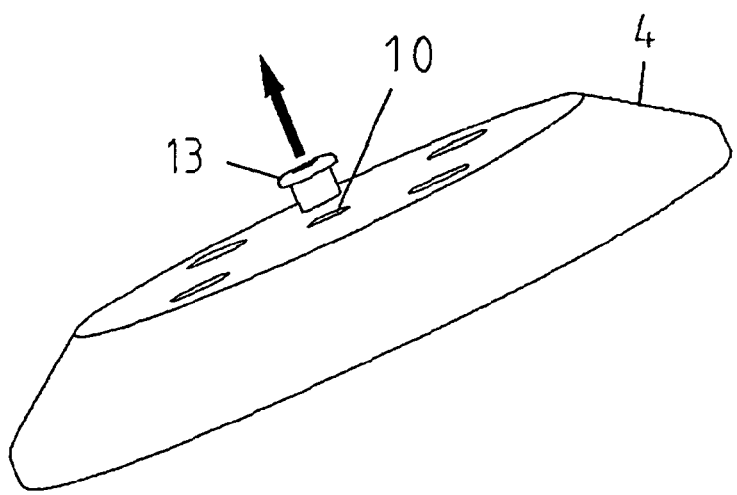
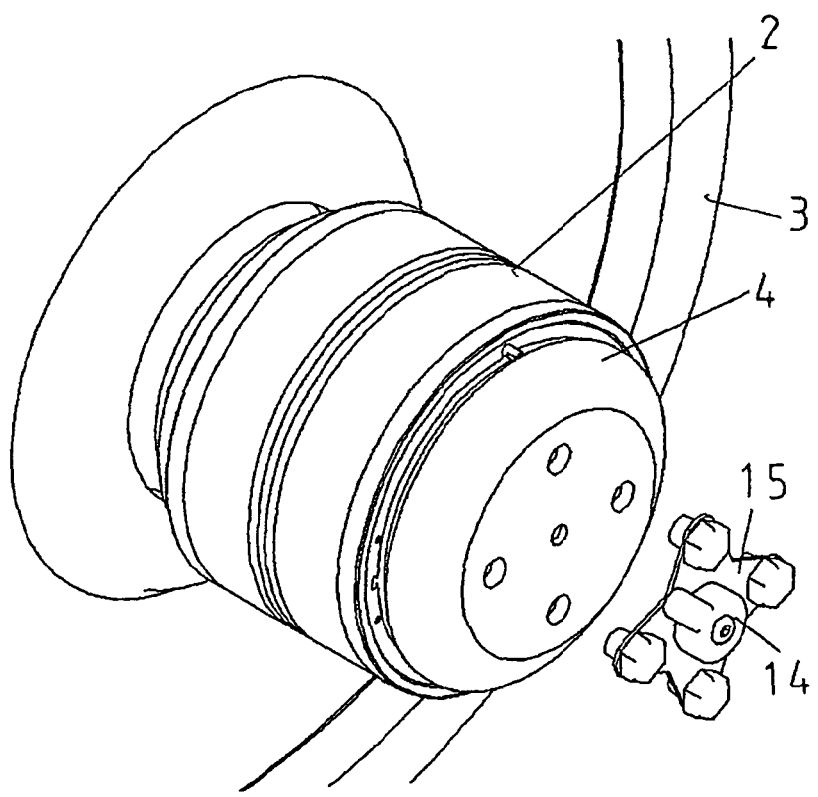

DEVICE FOR ATTACHMENT TO A ROTATING PART OF A RAILWAY AXLE

FIELD OF THE INVENTION

The present invention relates to a device for attachment to a rotating part of a railway vehicle. More particularly the invention relates to a device for attachment to a rotating part of a railway vehicle for detecting and evaluating different parameters related to the railway vehicle.

BACKGROUND OF THE INVENTION

The axles of railway vehicles are supported by bearings positioned in axleboxes, and for ascertaining the conditions of the bearings, and also of other parameters affecting the operation of the railway vehicle, it is required to monitor the conditions of bearings, wheels and other parameters it necessary to check these conditions regularly. Earlier such controls have been made with predetermined maintenance intervals.

In EP 1 159 182 B1 has been proposed a railway axle hub unit equipped with sensor means for detecting vibration in vertical direction, and/or in horizontal direction, and/or bearing temperature, and being mounted onto a stationary non-rotating support element, such as a metallic sealing insert.

PURPOSE OF THE INVENTION

A purpose of the invention is to provide a device for attachment to a rotating part of a railway vehicle with an ability of detecting, evaluating and signaling current conditions in the railway vehicle in a simple and reliable manner.

Another purpose is to provide attachment means for easy fitting the device to a rotating part of a railway vehicle.

SUMMARY OF INVENTION

According to the accompanying claim 1, the invention proposes a device for attachment to a rotating part of a railway vehicle incorporating an arrangement, which is adapted, during movement of the railway vehicle, to detect and evaluate parameters related to the railway vehicle service and/or to an incipient fault state of a wheel bearing in the railway vehicle, and which device is arranged to emit signals representative of the detected and evaluated parameters.

Thereby the invention is based among other items on the cognition, that an incipient fault state of the wheel bearing, but also the other parameters can also be reliably detected on a rotating part and/or without a direct contact to the bearing as such. Further it is another cognition of this invention, that the sensor(s) and electronic and non-electronic elements of said device require enhanced protection than applications in road vehicles, because of in general other shock and vibration situations and also because of the risk of mechanical damages e.g. by stones which can be catapulted from the railway road bed during rolling operation of the railway vehicle.

BRIEF DESCRIPTION OF THE DRAWINGS

Hereinafter the invention will be further described with reference to the accompanying drawings illustrating non-limiting embodiments of the invention.

FIG. 3 is an exploded view in perspective of a portion of the wheel set shown in FIG. 1, FIGS. 4 and 5 illustrate in perspective an end cap forming part of the wheel set embodiment according to FIG. 1 in views from the side thereof facing the axle end in mounted position and shown with an electronic device before mounting and thereafter.

FIG. 6 is a perspective view showing the end cap according to FIG. 3 shown with a removed inspection plug, and FIG. 7 is a portion of an axle end with an end cap and an electronic device attached to the outside of the end cap via a washer.

DESCRIPTION OF THE PREFERRED EMBODIMENTS

Figure 1:
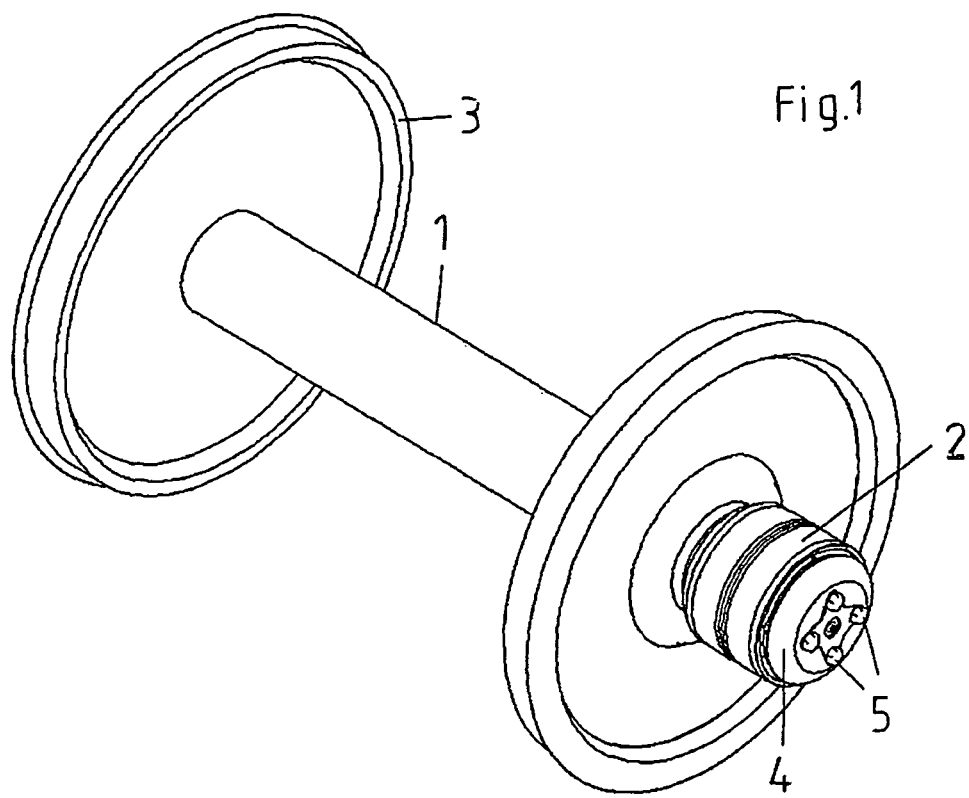
FIG. 1 illustrates in perspective a wheel set on an axle of a railway vehicle with an embodiment of the device according to the invention.

FIG. 1 illustrates schematically in perspective a wheel axle 1 of a railway vehicle, which at each end is rotatably supported in a set of bearings 2, each set provided in a not further shown axle box, and having a railway wheel 3 fixedly arranged around the axle adjacent each set of bearings 2. The end of the axle 1 adjacent each set of bearings 2 is covered by an end cap 4, which is attached to the axle by means of bolts 5. In this embodiment of the invention the device according to the invention is arranged inside the end cap 4, and is therefore well protected for moisture and dirt.

The device incorporates an electronic unit preferably equipped with transducers adapted to detect parameters related to the railway vehicle service and/or to an incipient fault state of a wheel bearing in the railway vehicle and evaluate, and which electronic unit also incorporates means for evaluating said parameters, and means for emitting signals representative for the detected and evaluated parameters. This electronic unit thus is positioned in such a manner as to participate in the rotation of the axle of the railway vehicle. Thereby the device can comprise at least one sensor for rotation detection e.g. for the total mileage run of the vehicle, one sensor for detection of vibrations related to the bearing performance and/or the wheel conditions, but also structural vibrations and/or one temperature sensor.

Figure 2:
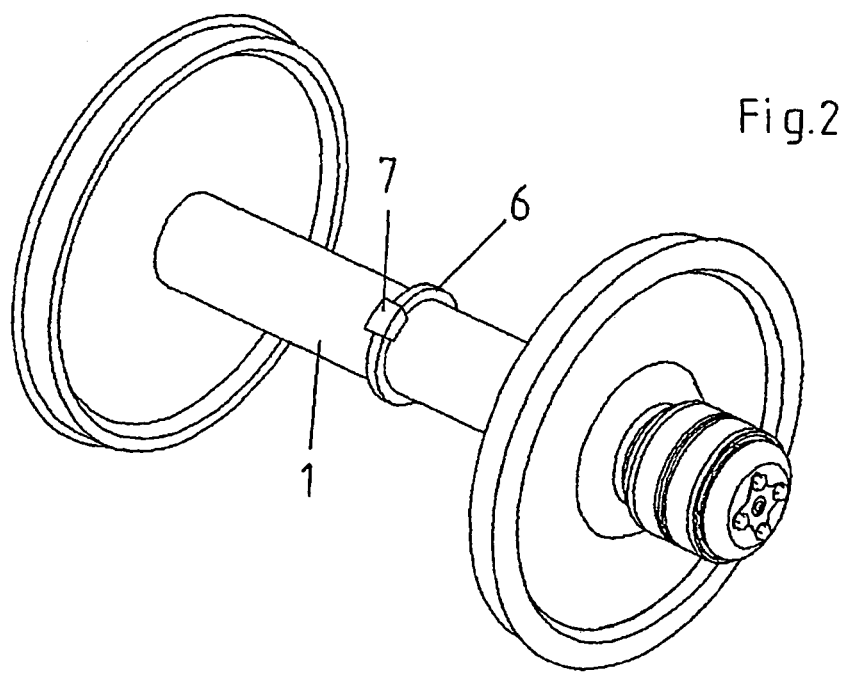
FIG. 2 is a corresponding wheel set with a second embodiment of the device according to the invention.

In FIG. 2 is schematically shown another embodiment, in which a ring 6 is arranged around the wheel axle 1, in a position between the two wheels 3, and in such a manner as to follow the rotation of the axle. The ring 6 in turn carries a box 7 incorporating an electronic unit similar to that according to the electronic unit described with reference to the embodiment according to claim 1.

FIG. 3 shows an exploded view of a portion of the wheel axle 1 in FIG. 1 with the end cap 4 removed from the axle end. The bolts 5 for attaching the end cap 4 to the axle end are arranged to be guided and held in a washer 8, having a number of bores for receiving the bolts, and a central opening 9, which, when the end cap is mounted on the axle end, is situated just in front of an aperture 10 in the center of the end cap 4. The electronic unit is preferably positioned inside an end cap such that the electronic unit is located completely within an inner wall of the end cap 4. The end cap 4 is also preferably configured to secure the electronic unit outside axle (rotating part) and prevent the positioning of the electronic unit within any recess in the axle (rotating part).

FIG. 4 shows a perspective view of an end cap 4, shown obliquely from the side thereof, which is facing the axel end when in mounted state. The aperture 10 opens in a recess 11 in the interior of the end cap 4. In this embodiment this recess 11 is substantially Y-shaped, although the recess may have other shapes and the shape is chosen after the shape of an electronic unit formed as a printed circuit board 12, which in the embodiment illustrated in FIG. 4, is inserted in the recess in the direction of the arrow in FIG. 4.

In FIG. 5 is shown the printed circuit board 12 inserted in the recess in the end cap 4. The printed circuit board 12 could also be covered by a layer of resin, not further shown, which is applied over the printed circuit board when this is positioned in the recess. In other embodiments it is also possible to fix said printed circuit board also to the internal part of the endcap with known joining technologies, like screwing, gluing, et cetera instead of the described form fit. Another possibility is that the device can be built as a small block containing the all electronics and fixed to the inner part of the end cap with known joining techniques.

FIG. 6 shows in perspective the end cap 4 according to FIG. 4, and here can be seen how a protective plug 13 is removed from the aperture 10. In this manner the protective plug 13 will protect the interior of the end cap 4 and the electronic unit 12 positioned therein, from external moisture and dirt during operation of the railway vehicle. The protective plug 13 can, as shown, be removed and give a possibility of inspection of the interior of the end cap, wherein suitable types of signaling means, such as for instance LEDs, which can have different colours for signaling different conditions of the service of the railway vehicle and of the bearings, and also bearing temperature, rotational speed, etcetera. The protective plug can also be designed as a switch to trigger the device to release the signaling, e.g. as soon as the plug is removed, the chosen signal code provides the signaling. In other embodiments the signaling can also be designed the way that it starts automatically only when necessary, e.g. if said plug is removed or if an incipient fault state is investigated. This is of advantage to reduce the power consumption in the device.

The signaling means can also be arranged to emit optical codes readable by a probe or other appropriate device.

Finally, the signaling means can be arranged to transmit the signals representing different vehicle, wheel and bearing parameters via wireless transmissions, such as transponder, radio, GPRS, etcetera.

In FIG. 7 is shown in perspective a portion of a railway wheel 3 with a set of bearings 2 and an end cap 4, fitted to the axle end. If the end cap is not readily removable, or for other reasons, the electronic unit can be positioned in an electronic capsule 14 positioned in a special safety washer 15, whereby it thus is positioned on the outside of the end cap 4, but still in contact with the rotating axle 1. The safety washer 15 is preferably attached to the end cap and the axle end with aid of bolts in the same manner as the end cap in the embodiment illustrated in FIG. 3.

The electronic unit can be powered by at least one battery (not further shown) positioned adjacent or at a distance from the electronic unit.

The device can alternatively incorporate at least one power generator for powering the electronic unit, or an energy transforming device for powering the electronic unit, whereby e.g. vibration energy via Piezo-elements or temperature can be converted into electrical power.

Alternatively the electronic unit can have a combination of a battery, a power generator and/or an energy transforming device for powering the unit.

The invention is not limited to the embodiments illustrated in the drawings and described with reference thereto, bit modifications and variants are possible within the scope of the appended claims.

The invention claimed is:

1. A monitoring device for a railway vehicle, the vehicle including at least one rotating part and at least one bearing, the device comprising:

an electronic unit configured to attach to the at least one rotating part and including a transducer configured to detect and evaluate at least one parameter, the at least one parameter relating to at least one of rotation of the rotating part and vibration of the bearing, and configured to emit signals representative of the detected and evaluated parameter;

wherein the electronic unit is positioned inside an end cap such that the electronic unit is located completely within an inner wall of the end cap, the end cap being configured to secure the electronic unit outside the rotating part and prevent the positioning of the electronic unit within any recess in the rotating part.

2. The device as claimed in claim 1, wherein a wheel axle includes the at least one bearing on an end thereon.

3. The device as claimed in claim 2, wherein the end cap has a side facing an axle end and a recess extending into the side and the electronic unit is disposed in the recess.

4. The device as claimed in claim 1, wherein the end cap has an inspection opening extending through the end cap and positioned in alignment with a signal means arranged inside the electronic unit.

5. The device as claimed in claim 4, wherein the electronic unit further includes a protective plug configured to detachably close the inspection opening in the end cap.

6. The device as claimed in claim 4, wherein the electronic unit includes an electronic capsule positioned outside of the end cap and a safety washer for retaining the position of the capsule.

7. The device as claimed in a claim 4, wherein the electronic capsule is connected with one of the washer and the end cap.

8. The device as claimed in claim 1, wherein the transducer is adapted to detect temperature.

9. The device as claimed in claim 1, wherein the electronic unit includes analyzing means for evaluating at least one of speed, total mileage run, vibration related to bearing performance, vibration related to wheel condition, bearing operating temperature and structural vibrations.

10. The device as claimed in claim 1, wherein the device includes at least one of a battery, a power generator, and an energy transforming device for powering the electronic unit.

11. The device as claimed in claim 1, wherein the device includes signal means for emitting signals representative of a condition of one of the rotating part and the bearing.

12. The device as claimed in claim 11, wherein the signal means includes at least one light emitting diode.

13. The device as claimed in claim 11, wherein the signal means are configured to emit optical codes readable by a probe.

14. The device as claimed in claim 11, wherein the signal means are configured to wirelessly transmit the signals.

15. A monitoring device for a railway vehicle, the vehicle including at least one rotating part and at least one bearing, the device comprising:

an electronic unit configured to attach to the at least one rotating part and including a transducer configured to detect and evaluate at least one parameter, the at least one parameter relating to at least one of rotation of the rotating part and vibration of the bearing, and configured to emit signals representative of the detected and evaluated parameter;

wherein the electronic unit is positioned in a box located on a wheel axle of the vehicle, the box in which the electronic unit is positioned completely encloses the electronic unit such that a portion of the electronic unit does not extend outwardly from the box, the box being configured to secure the electronic unit outside the wheel axle and to prevent the positioning of the electronic unit within any recess in the wheel axle.

16. The device as claimed in claim 15, wherein the device includes signal means for emitting signals representative of a condition of one of the rotating part and the bearing.

17. The device as claimed in claim 16, wherein the signal means includes at least one light emitting diode.

18. The device as claimed in claim 15, wherein the device is powered by an energy transforming device.

19. A monitoring device for a railway vehicle, the vehicle including at least one rotating part and at least one bearing, the device comprising:
   an electronic unit configured to attach to the at least one rotating part and including a transducer configured to detect and evaluate at least one parameter, the at least one parameter relating to at least one of rotation of the rotating part and vibration of the bearing, and configured to emit signals representative of the detected and evaluated parameter;
   wherein the electronic unit is positioned in an enclosure positioned on the rotating part the enclosure in which the electronic unit is positioned completely encloses the electronic unit such that a portion of the electronic unit does not extend outwardly from the enclosure, the enclosure being configured to secure the electronic unit outside the rotating part and prevent the positioning of the electronic unit within any recess in the rotating part.

* * * * *